July 11, 1967  J. V. DUNLEA, JR  3,330,088
METHOD OF BULK RUBBISH DISPOSAL
Filed Dec. 23, 1964  2 Sheets-Sheet 1

INVENTOR.
JOHN V. DUNLEA, JR.
BY
Russell, Chittick & Pfund

July 11, 1967　　　J. V. DUNLEA, JR　　　3,330,088
METHOD OF BULK RUBBISH DISPOSAL
Filed Dec. 23, 1964　　　　　　　　　　　　　2 Sheets-Sheet 2

INVENTOR.
JOHN V. DUNLEA, JR.
BY
Russell, Chittick & Pfund 3,330,088
METHOD OF BULK RUBBISH DISPOSAL
John V. Dunlea, Jr., 1 Longwood Drive,
Andover, Mass. 01810
Filed Dec. 23, 1964, Ser. No. 420,512
6 Claims. (Cl. 53—24)

This invention relates to bulk rubbish disposal and is particularly concerned with an efficient low cost method of preparing large quantities of rubbish for disposal at sea.

The problem of bulk rubbish disposal has yet to be solved to the satisfaction of state and municipal authorities. This is clearly evident from the number of unsuccessful schemes which have been proposed and experimented with in the past. For example, the earliest method of bulk rubbish disposal and one which is still being utilized in some areas is that of "open dumping," i.e., simply depositing rubbish at a dump site located adjacent an open relatively unpopulated area of a city or town. At intervals the accumulated rubbish is burned to reduce its bulk and then covered by gravel or dirt. This method is of course highly unsanitary because accumulations of rubbish breed vermin which in turn carry and communicate diseases. Moreover, dump fires produce large quantities of smoke which contribute to the problem of air pollution. Finally, as large cities continually increase in size and suburban areas become more populated, available dumping sites are rapidly disappearing. Thus it can be seen that open dumping is no longer an acceptable solution to the problem of rubbish disposal, particularly in areas of expanding population.

As a replacement for open dumping, many cities have resorted to processing rubbish by various means such as incineration or chemical treatment. Incineration has been employed rather extensively and had succeeded in alleviating some of the sanitation problems created by open dumping. However, in addition to being costly and contributing to the problem of air pollution, incineration is relatively inefficient. For example, a properly operated newly designed incinerator may be expected to turn out 30–40% residue. In other words, for every 100 tons of rubbish burned, 30–40 tons of residue or burned material will still have to be disposed of. Thus it can be seen that even with incineration, problems created by air pollution and subsequent disposal are still present.

Chemical treatment of rubbish, sometimes referred to as "composting," is a relatively new method of rubbish disposal and one that is being experimented with in areas having extensive agricultural interests. Composting is the method by which rubbish is chemically treated, the end result being a material which may be utilized as a fertilizer or mulch. However, since a composting process produces approximately an 80% residue, it can only be efficiently utilized where a market is readily available for the end product. Thus in many highly populated non-agricultural areas, as for example, the areas around large cities such as Boston or New York, this method would not be of any practical value since it would be too expensive to transport the end product to remotely situated agricultural markets.

In an effort to avoid the aforementioned problems, some cities located along the seacoast have attempted ocean dumping. This method has the obvious advantage of a readily available and practically inexhaustable dumping site. However, in spite of these advantages, ocean dumping has failed to achieve any appreciable measure of success as a substitute for more conventional methods of rubbish disposal. This failure is due primarily to the resulting production of flotsam during a conventional sea dumping operation. The flotsam, which is comprised of bits and pieces of buoyant refuse, floats on the surface and is eventually carried by the prevailing winds and ocean currents onto nearby beaches. This in turn prompts property owners to object violently to this practice and in most instances, causes municipal authorities to refrain immediately from further ocean dumping.

An object of the present invention is to avoid the production of flotsam during an ocean dumping operation, thereby enabling this method of rubbish disposal to be utilized without the danger of littering adjacent coastlines. This is accomplished by compacting the rubbish into relatively large bundles which have a density greater than the water into which they will ultimately be dumped. Following the compacting operation, the exposed surfaces of the bundles are treated in a manner that will preclude their disintegration upon contact with water. Thereafter, when the bundles are dumped into the ocean, they sink immediately to the bottom with no resulting flotsam due to the aforementioned surface treatment which the bundles have undergone.

Where circumstances so dictate, other steps may be taken in conjunction with those mentioned above when practicing the present invention. For example, depending on the type of rubbish being handled, it may be desirable to grind or shred the material prior to compaction. The production of high density bundles may also be aided by mixing the rubbish with a low cost adhesive prior to compaction. These and other variations to be hereinafter described in greater detail may be combined to practice the method of gathering rubbish into high density bundles which may subsequently be dumped at sea without fear of littering adjacent beaches.

Figure 1:
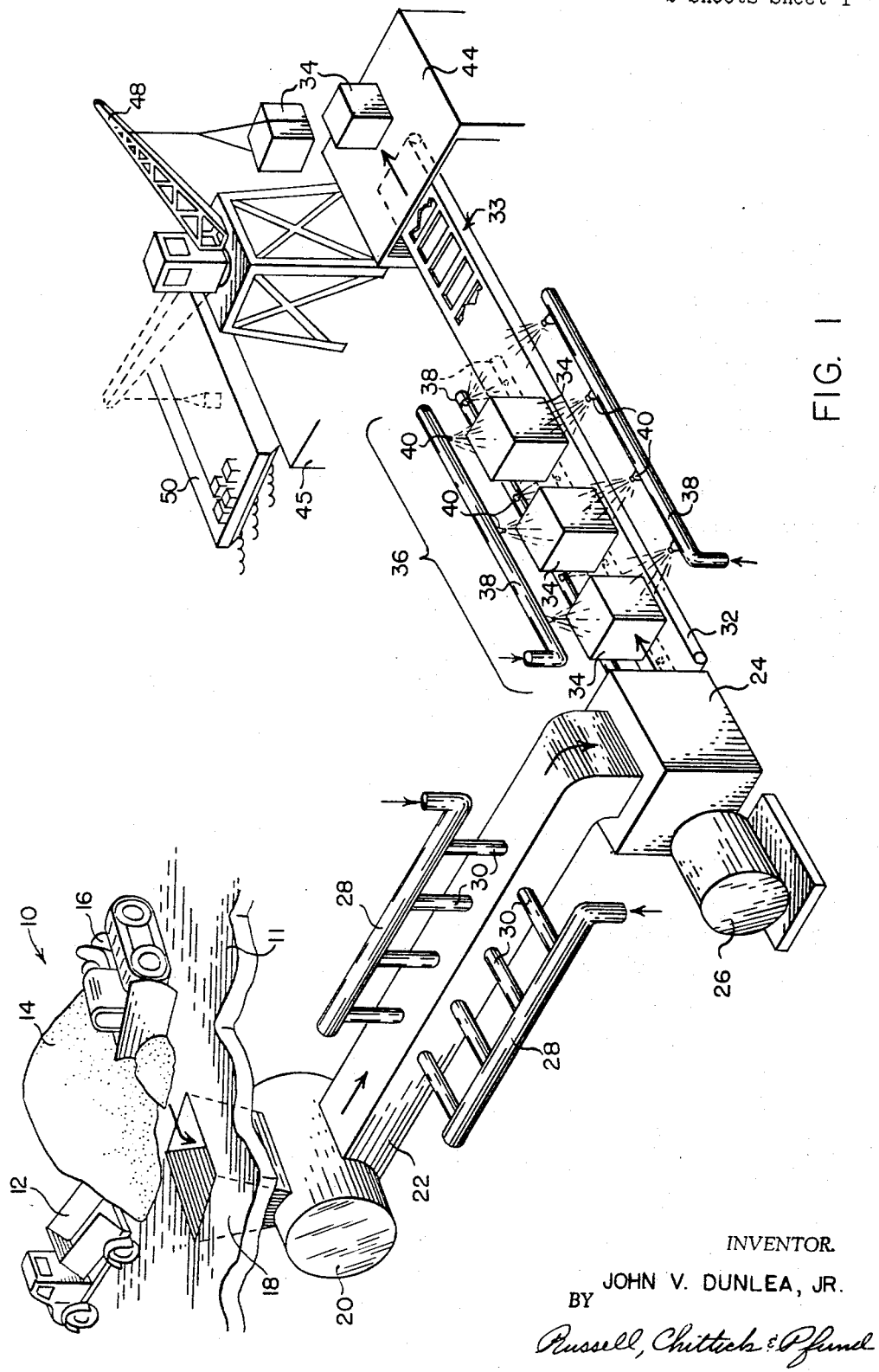
FIG. 1 is a diagrammatic view in perspective showing one embodiment of apparatus utilized in practicing the method of the invention.

Referring initially to FIG. 1, a rubbish receiving area generally indicated by the reference numeral 10 is shown comprised basically of a receiving apron 11 onto which conventional dump trucks 12 may be driven to temporarily deposit rubbish in a large pile 14. Any convenient means such as the bulldozer 16 illustrated in the drawings may be utilized to feed rubbish from pile 14 into a receiving hopper 18 which leads downwardly to a grinding apparatus 20. The grinding apparatus may be of any conventional type such as for example that disclosed in the May 1964 edition of Westinghouse Engineer. The grinding operation breaks the rubbish down into substantially uniform pieces which may be more easily handled by the remainder of the apparatus.

Following the grinding operation, the rubbish is transported by an enclosed conveyor 22 to a compactor 24 which is operated by a hydraulic unit 26. Where it is deemed advisable, the rubbish may be mixed with an adhesive while traveling on enclosed conveyor 22 before being deposited in compactor 24. In the embodiment disclosed in FIG. 1, liquid adhesive such as for example asphaltum (heated above the melting point) is carried under pressure by main feed lines 28 from a remote storage tank (not shown). Lines 28 are in turn connected to enclosed conveyor 22 by a plurality of suitably spaced intermediate feed pipes indicated typically by the reference numeral 30. With this arrangement, ground rubbish particles are thoroughly coated with the adhesive prior to being deposited in compactor 24, thereby greatly facilitating the compacting operation by promoting a binding action as the rubbish particles are subsequently pressed together.

It is to be understood that under certain conditions, the grinding operation and/or the mixture of rubbish with an adhesive prior to the compacting operation may be dispensed with. Whether or not these optional steps are utilized will depend to a considerable extent on the type of rubbish being processed. When these steps are not utilized, the rubbish will be dumped directly into compactor 24 from pile 14.

Following the deposit of a predetermined weighted quantity of rubbish particles into compactor 24, the compactor is operated to press the rubbish into a high density bundle or bale 34 which is subsequently ejected from the apparatus onto an adjacent conveyor 32. Although the bundles 34 emerging from compactor 24 have been shown in the drawing in the form of large cubes, it is to be understood that any shape may be produced by varying the design of the compactor.

Following the compacting operation, the high density compacted rubbish bundles 34 are carried by conveyor 32 through a surface treating zone generally indicated by the reference numerals 36. In the embodiment shown in the drawings, conveyor 32 is surrounded on either side and along the top and bottom by spaced parallel feed pipes 38 which carry a liquid coating material under pressure. Each pipe is further provided with a series of nozzles 40 which spray all exposed surfaces of the compacted bundles 34 as they are carried along the length of conveyor 32. To facilitate this coverage of the bottom surfaces of the bundles, the belt of conveyor 32 is of an open construction as indicated typically at 33. The liquid coating material may be any low cost commercially available type such as asphaltum heated above the melting point and when applied as shown, will quickly harden upon cooling into an impervious coating. This coating is designed to preclude subsequent surface deterioration of the bundles when they are exposed to water.

It is to be understood at this point that the bundles may be subjected to surface treatments in addition to or other than the spray coating described above. For example, the compacted bundles 34 could be dipped into a bath of any commercially available coating material in order to apply an impervious coating over all exposed surfaces. As a further modification, instead of applying an impervious coating to the bundles, they could be wrapped in a wire mesh or a plastic strapping applied. Furthermore, this step might be used in conjunction with a coating operation. In any event, the important concept to be recognized is the treatment of the bundle in order to avoid subsequent deterioration of its surface by contact with water.

Figure 2:
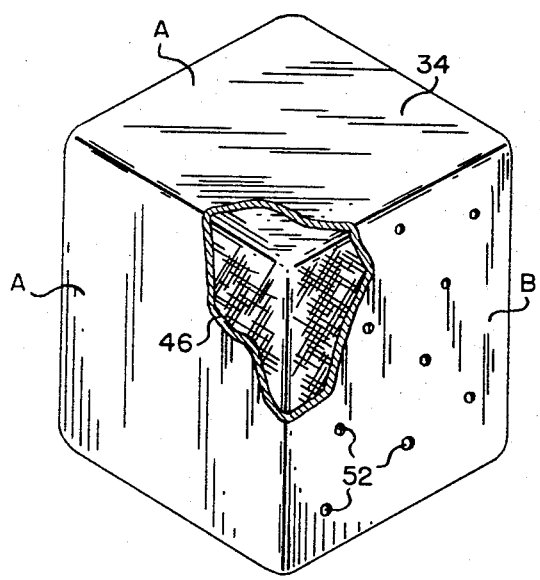
FIG. 2 is a view in perspective of a typical rubbish bundle produced by compaction with a corner portion broken away to better illustrate the surface coating of impervious material which has been applied following compaction.

A typical bundle 34 has been shown in FIG. 2 following the application of an impervious coating 46 to all of its exposed surfaces. The thickness of coating 46 has been exaggerated for illustrative purposes. Coating 46 may be left intact following its application as shown on surfaces "A" of the bundle, or it may be punctured as indicated typically by the holes 52 on said "B" in order to allow entry of water into the interior of the bundle when it is subsequently dumped at sea. Where the bundle has had an impervious coating applied thereto, or where it has been wrapped with a wire mesh or plastic strapping, such perforations are of course not necessary. Where the compacting operation produces a bundle with a much greater density than that of water, puncturing is not necessary. However, where the density of the bundle is close to or less than that of water, puncturing is desirable in order to preclude any possibility of the bundle remaining afloat.

Following the surface treatment operation, compacted bundles 34 continue along conveyor 32 to a loading ramp 44 which is preferably located adjacent a pier 45.

As the bundles arrive at loading ramp 44, they are picked up by any convenient means such as a loading crane 48 and deposited in an awaiting barge 50 which when loaded, will be towed out to a prescirbed duming site and emptied. The crane boom has been shown in solid lines picking up a bundle and in dotted line at a position overlying the barge 50.

Figure 3:
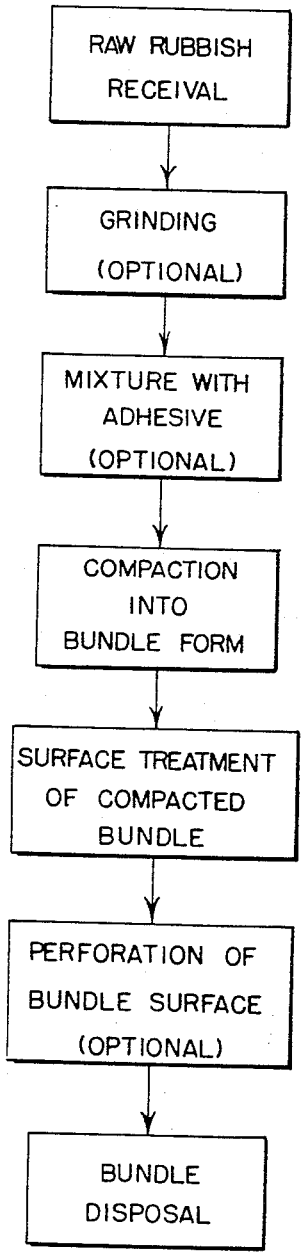
FIG. 3 is a block diagram illustrating the operational sequence of the apparatus shown in FIG. 1.

Referring now to FIG. 3, the sequence of operation disclosed in FIG. 1 has been outlined diagrammatically in block form. Raw rubbish is received, initially ground and then mixed with an adhesive prior to being compacted into bundle form. The grinding operation and the mixture of the material with adhesive are optional steps and need not be included where the material is sufficiently uniform in its raw state and in addition, possesses the characteristics which permit it to be compacted into an integral bundle without first being treated with adhesive. Following the compacting operation, the exposed surfaces of the bundles are treated to prevent their subsequent deterioration when exposed to water. This surface treatment may include the application of an impervious coating and/or the use of other retaining means such as envelopment with a small gauge wire mesh. Following the surface treatment of the bundle, its surfaces may be perforated where this is desirable, this step also being optional. The bundles are then loaded onto an awaiting vessel where they are subsequently transported to the dumping site.

The advantages to be gained from the above-described method may be summarized as follows: to begin with, the problems associated with open dumping are completely obviated. For example, the rubbish is temporarily piled on receiving apron 11 for only a brief interval prior to being processed into compacted bundles. An extensive accumulation is avoided by continuously processing incoming loads and in this manner, unsanitary conditions are prevented. Moreover, this continuous processing avoids the necessity of burning the rubbish to reduce its bulk.

The present method also obviates the necessity of processing the rubbish by incineration or composting. Instead, the material is simply compacted and then prepared by a relatively simple surface treating operation for subsequent disposal at sea. By surface treating the bundles in accordance with methods previously outlined, any possibility of creating objectionable flotsam during the dumping operation is completely obviated. Thus it can be seen that by use of the present method, large quantities of rubbish may be readily disposed of at sea in a convenient manner which avoids problems now rendereing this solution impractical.

It is my intention to cover all changes and modifications of the invention herein chosen for purposes of disclosure which do not depart from the spirit and scope of the invention.

I claim:

1. A method of bulk rubbish disposal comprising: collecting said rubbish into a predetermined weighted quantity, mixing said rubbish with an adhesive, compacting said rubbish into a bundle having a density greater than water, applying an impervious coating to the surface of said bundle, puncturing said impervious coating at selected points in order to permit water penetration into the interior of said bundle, and thereafter dumping said bundle into a large body of water where it will readily sink to the bottom.

2. The method of disposing of large quantities of rubbish at sea comprising: collecting said rubbish into predetermined weighted quantities, compacting said weighted quantities into bundles having densities greater than that of sea water, applying an impervious coating to the exposed surfaces of said bundles, and thereafter dumping said bundles at sea where they will readily submerge with their coated surfaces remaining intact.

3. The method as described in claim 2 further characterized by breaking said rubbish down into substantially uniform particles prior to the compaction thereof into said predetermined weighted quantities.

4. A method of bulk rubbish disposal comprising: collecting said rubbish into a predetermined weighted quantity, mixing an adhesive with said rubbish, compacting said rubbish into a bundle having a density greater than that of water, treating the exposed surfaces of said bundle to prevent disintegration thereof by contact with water, and thereafter dumping said bundles into a large body of water where they will readily submerge.

5. A method of bulk rubbish disposal comprising: collecting rubbish into predetermined weighted quantities, compacting said predetermined weighted quantities to produce bundles which will readily sink when subsequently dumped into a large body of water, treating the surfaces of said bundles to prevent subsequent deterioration thereof when exposed to water, and finally disposing of said bundles by dumping them into a large body of water.

6. A method of bulk rubbish disposal comprising the steps of: collecting and compacting said rubbish into high density bundles incapable of floating when deposited in a large body of water, wrapping said bundles with a wire mesh which will prevent the surface of said bundles from disintegrating when subsequently brought into contact with water, applying an impervious coating to said bundles, and subsequently dumping said bundles into a large body of water where they will readily sink to the bottom.

References Cited
UNITED STATES PATENTS

| | | | |
|---|---|---|---|
| 2,493,652 | 1/1950 | Bowersox | 53—24 |
| 2,763,203 | 9/1956 | Russell | 53—124 XR |
| 3,065,586 | 11/1962 | Ghiringhelli | 53—124 |
| 3,084,620 | 4/1963 | Gibbons | 100—97 XR |
| 3,180,249 | 4/1965 | Patros. | |
| 3,229,618 | 1/1966 | O'Conner | 53—124 XR |

FOREIGN PATENTS 938,211    10/1963    Great Britain.

GRANVILLE Y. CUSTER, Jr., *Primary Examiner.*